(12) United States Patent
Doll

(10) Patent No.: US 11,391,045 B2
(45) Date of Patent: Jul. 19, 2022

(54) INSULATING WALL PANELS FOR BUILDING CONSTRUCTION AND RELATED METHODS

(71) Applicant: R-Rok Solutions, LLC, Ogden, UT (US)

(72) Inventor: Donald Doll, Ogden, UT (US)

(73) Assignee: R-Rok Solutions, LLC, Ogden, UT (US)

( * ) Notice: Subject to any disclaimer, the term of this patent is extended or adjusted under 35 U.S.C. 154(b) by 0 days.

(21) Appl. No.: 16/946,179

(22) Filed: Jun. 9, 2020

(65) Prior Publication Data

US 2020/0299961 A1  Sep. 24, 2020

Related U.S. Application Data

(63) Continuation of application No. 16/193,397, filed on Nov. 16, 2018, now Pat. No. 10,837,174.

(Continued)

(51) Int. Cl.
| | |
|---|---|
| *E04C 2/32* | (2006.01) |
| *B32B 3/28* | (2006.01) |
| *B32B 7/12* | (2006.01) |
| *B32B 13/08* | (2006.01) |
| *E04B 2/02* | (2006.01) |
| *E04C 2/296* | (2006.01) |
| *E04B 2/72* | (2006.01) |
| *E04C 2/34* | (2006.01) |

(Continued)

(52) U.S. Cl.
CPC .......... *E04C 2/322* (2013.01); *B28B 19/0092* (2013.01); *B32B 3/28* (2013.01); *B32B 7/12* (2013.01); *B32B 13/06* (2013.01); *B32B 13/08* (2013.01); *E04B 2/02* (2013.01); *E04B 2/723* (2013.01); *E04C 2/296* (2013.01); *E04C 2/34* (2013.01); *B32B 2607/00* (2013.01); *E04B 2002/0256* (2013.01); *E04B 2103/04* (2013.01); *E04C 2002/3444* (2013.01); *E04C 2002/3466* (2013.01)

(58) Field of Classification Search
CPC .. E04C 2002/3472; E04C 2/322; E04C 2/296; E04C 2002/3466; E04C 2002/3444; E04B 2001/7691; E04B 2/02; B32B 3/28; B32B 7/12; B32B 13/08; B32B 2607/00; B32B 21/06; B32B 15/12; B32B 29/08; B32B 9/06; B32B 2307/30
See application file for complete search history.

(56) References Cited

U.S. PATENT DOCUMENTS

| 4,127,619 A * | 11/1978 | Godfrey ................ C09J 123/06 |
|---|---|---|
| | | 524/481 |
| 4,328,652 A | 5/1982 | Naumovich, Jr. |

(Continued)

*Primary Examiner* — Andrew J Triggs
(74) *Attorney, Agent, or Firm* — TraskBritt

(57) ABSTRACT

Wall panels for building construction may include a corrugated sheet including a first series of peaks on a first side of the corrugated sheet configured for positioning to face a room interior. The corrugated sheet may also include a second series of peaks on a second, opposite side of the corrugated sheet configured for positioning to face a room exterior. A radiant barrier including a material reflective to heat may be secured only to the second series of peaks. The corrugated sheet may form pockets of air between the radiant barrier and the corrugated sheet.

10 Claims, 9 Drawing Sheets

Related U.S. Application Data

(60) Provisional application No. 62/674,161, filed on May 21, 2018.

(51) Int. Cl.
    *B28B 19/00*      (2006.01)
    *B32B 13/06*      (2006.01)

(56) References Cited

U.S. PATENT DOCUMENTS

| | | | |
|---|---|---|---|
| 5,016,411 A | 5/1991 | Thorsnes | |
| 5,339,577 A * | 8/1994 | Snyder | B32B 3/28 |
| | | | 52/95 |
| 5,830,548 A | 11/1998 | Andersen et al. | |
| 6,557,313 B1 | 5/2003 | Alderman | |
| 6,711,872 B2 | 3/2004 | Anderson | |
| 7,288,164 B2 | 10/2007 | Roberge et al. | |
| 8,763,330 B2 | 7/2014 | Pollack | |
| 9,091,049 B2 | 7/2015 | Walker | |
| 9,604,428 B2 | 3/2017 | Walker | |
| 9,605,426 B2 | 3/2017 | Robins et al. | |
| 10,837,174 B2 * | 11/2020 | Doll | B32B 7/05 |
| 2002/0189195 A1* | 12/2002 | McKague, Jr. | B32B 3/28 |
| | | | 52/783.19 |
| 2003/0019176 A1 | 1/2003 | Anderson | |
| 2003/0192278 A1 | 10/2003 | Snyder et al. | |
| 2004/0250490 A1 | 12/2004 | Hall | |
| 2007/0108307 A1 | 5/2007 | Sinclaire | |
| 2007/0181704 A1 | 8/2007 | Ernst | |
| 2009/0250291 A1 | 10/2009 | Sparks et al. | |
| 2010/0236206 A1* | 9/2010 | Klupski | B01D 46/527 |
| | | | 55/521 |
| 2010/0313515 A1 | 12/2010 | Betz et al. | |
| 2011/0107723 A1* | 5/2011 | Hurlburt | B32B 29/00 |
| | | | 52/794.1 |
| 2011/0195231 A1 | 8/2011 | Lai et al. | |
| 2011/0262699 A1 | 10/2011 | Yializis et al. | |
| 2011/0296781 A1 | 12/2011 | McCary | |
| 2014/0037905 A1* | 2/2014 | Cerutti | E04B 1/7662 |
| | | | 428/167 |
| 2014/0093678 A1 | 4/2014 | Walker | |
| 2014/0134394 A1 | 5/2014 | Noble et al. | |
| 2014/0141199 A1 | 5/2014 | Leonard | |
| 2014/0248814 A1 | 9/2014 | Handermann | |
| 2015/0004371 A1 | 1/2015 | Noble | |
| 2015/0218813 A1 | 8/2015 | Koca et al. | |
| 2015/0239201 A1 | 8/2015 | Walker | |
| 2015/0274390 A1 | 10/2015 | Ghali | |
| 2015/0336351 A1 | 11/2015 | Orologio | |
| 2017/0001422 A1* | 1/2017 | Bauernfeind | B32B 27/10 |
| 2017/0182731 A1 | 6/2017 | Walker | |
| 2017/0335559 A1* | 11/2017 | Erdie | A47F 5/11 |
| 2018/0126688 A1 | 5/2018 | Walker | |
| 2019/0352904 A1* | 11/2019 | Doll | B32B 9/005 |
| 2020/0299961 A1* | 9/2020 | Doll | E04B 2/02 |

\* cited by examiner

INSULATING WALL PANELS FOR BUILDING CONSTRUCTION AND RELATED METHODS

CROSS-REFERENCE TO RELATED APPLICATIONS

This application is a continuation of U.S. patent application Ser. No. 16/193,397, filed Nov. 16, 2018, now U.S. Pat. No. 10,837,174, issued Nov. 17, 2020, which claims the benefit under 35 U.S.C. § 119(e) of U.S. Provisional Patent Application Ser. No. 62/674,161, filed May 21, 2018, the disclosure of each of which is hereby incorporated herein in its entirety by this reference.

FIELD

This disclosure relates generally to insulating wall panels for building construction. More specifically, disclosed embodiments relate to insulating wall panels that may better inhibit heat transfer, reduce cost, and enable easier installation.

BACKGROUND

Drywall is a commonly used building material in building construction, particularly for internal walls. For example, internal walls may be built by forming a wood frame, securing panels of drywall to the wood frame (e.g., using screws), and applying joint tape and/or joint compound to the joints between adjacent panels of drywall to reinforce the drywall and form smooth surfaces and corners. Insulation against conductive and convective heat may be provided, for example, by placing foam or fiberglass in the spaces between wood frame members on a side of the drywall opposite the interior. Radiant insulation in the form of a thin sheet of heat-reflective, metal material may also be provided, which may be accomplished by adhering a sheet of radiant insulation directly to the surface of the drywall that does not face the interior.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

The illustrations presented in this disclosure are not meant to be actual views of any particular wall panel or component thereof, but are merely idealized representations employed to describe illustrative embodiments. Thus, the drawings are not necessarily to scale.

Disclosed embodiments relate generally to insulating wall panels that may better inhibit heat transfer, reduce cost, and enable easier installation. More specifically, disclosed are embodiments of wall panels for building construction that may include a panel of drywall material, a radiant barrier, and a corrugated sheet interposed between the panel of drywall material and the radiant barrier, the corrugated sheet configured to provide an air gap between the panel of drywall material and the radiant barrier without requiring complicated and expensive formation and installation techniques.

As used herein, the terms "substantially" and "about" in reference to a given parameter, property, or condition means and includes to a degree that one of ordinary skill in the art would understand that the given parameter, property, or condition is met with a degree of variance, such as within acceptable manufacturing tolerances. For example, a parameter that is substantially or about a specified value may be at least about 90% the specified value, at least about 95% the specified value, at least about 99% the specified value, or even at least about 99.9% the specified value.

As used herein, spatially relative terms, such as "upper," "lower," "bottom," and "top," are for ease of description in identifying one element's relationship to another element, as illustrated in the figures. Unless otherwise specified, the spatially relative terms are intended to encompass different orientations of the elements in addition to the orientation depicted in the figures. Thus, the term "upper" can encompass elements above, below, to the left of, or to the right of other elements, depending on the orientation of an assembly. The assembly may be otherwise oriented (rotated ninety degrees, inverted, etc.) and the spatially relative descriptors used herein interpreted accordingly.

As used herein, the term "corrugated" means and includes shapes having alternate ridges and grooves. For example, structures that are corrugated may include alternating rows of ridges and grooves or alternating dimples and protrusions in an array, at least one pair of which may form a cross-section having a waving shape.

Figure 1:
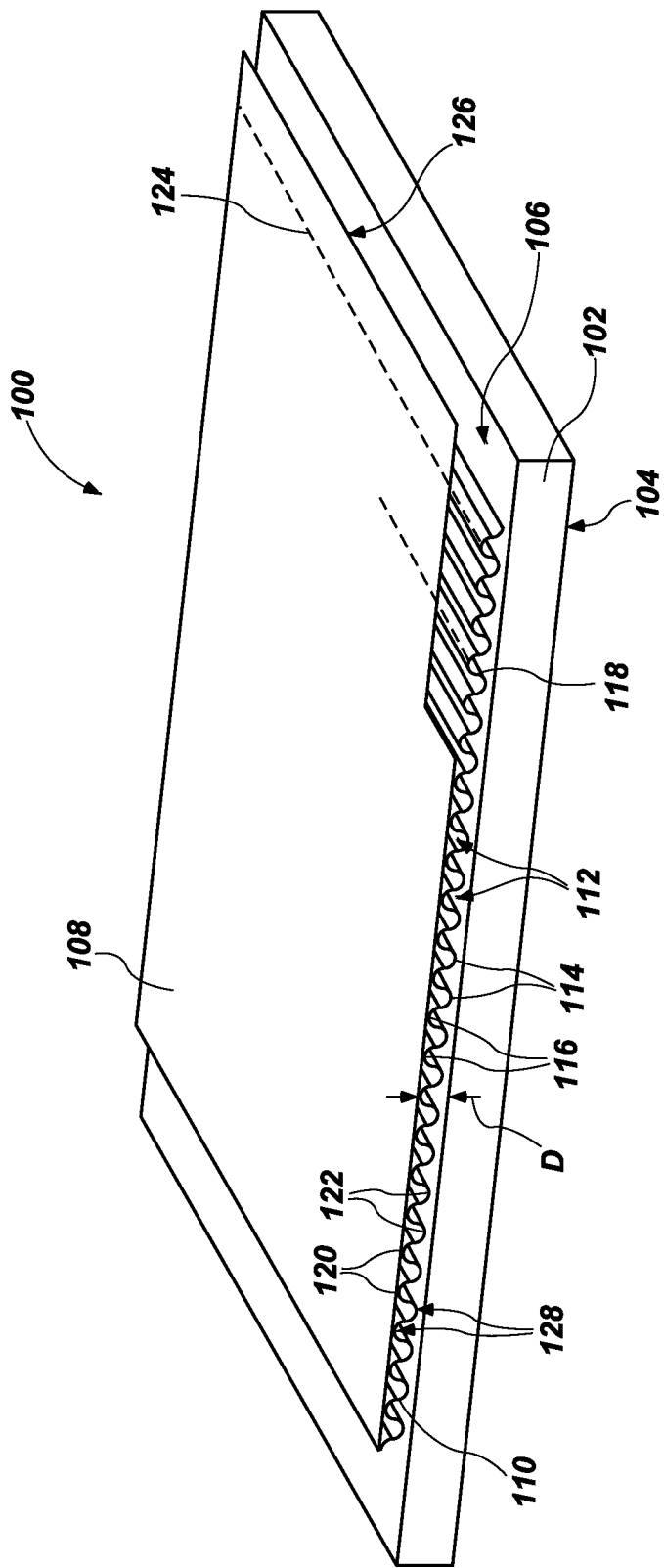
FIG. 1 is a partial-cutaway perspective view of a wall panel for building construction.

FIG. 1 is a partial-cutaway perspective view of a wall panel 100 for building construction. The wall panel 100 may include a panel 102 of drywall material. The panel 102 may include a room-interior-facing surface 104 positioned and configured to face a room's interior when the panel 102 is installed as part of a wall of the room. The panel 102 may include a room-exterior-facing surface 106 located on an opposite side of the panel 102 from the room-interior-facing surface 104, the room-exterior-facing surface 106 positioned and configured to face a room's exterior when the panel 102 is installed as part of a wall of the room. The room-interior-facing surface 104 of the panel 102 may be positioned to form a closest surface of the panel 102 relative to the room's interior when the panel 102 is installed as part of a wall of the room. The drywall material of the panel 102 may include, for example, gypsum (i.e., calcium sulfate dehydrate), which may be supported between sheets of facer and backer paper. In other embodiments, the panel 102 may include other building materials, such as, for example, wood paneling, ceramic tile, or stone.

The wall panel 100 may include a radiant barrier 108 including a material reflective to at least heat located proximate to the room-exterior-facing surface 106. More specifically, the radiant barrier 108 may be located on a side of the panel 102 of drywall material opposite the room-interior-facing surface 104. The radiant barrier 108 may be configured to inhibit the effect of radiant heat on the temperature of the room's interior when the wall panel 100 is installed as part of a wall of the room. The radiant barrier 108 may form a rearmost surface (i.e., a most exterior portion relative to the interior of a room) of the wall panel 100 on a side of the panel 102 of drywall material facing the room-exterior-facing surface 106. The radiant barrier 108 may include, for example, a sheet or foil of thermally reflective material. More specifically, the radiant barrier 108 may include, for example, a foil of aluminum material having a thermally and optically reflective surface finish.

A corrugated sheet 110 may be interposed between the panel 102 of drywall material and the radiant barrier 108, forming pockets 112 of air between the panel 102 of drywall material and portions of the corrugated sheet 110 and between the radiant barrier 108 and other portions of the corrugated sheet 110. For example, the corrugated sheet 110 may include a first series of peaks 114 and a corresponding first series of troughs 116 located proximate to the room-exterior-facing surface 106 of the panel 102 of drywall material. The first series of peaks 114 may form lines 118 of contact between the corrugated sheet 110 and the next-closest component of the wall panel 100, which in the embodiment of FIG. 1 is the panel 102 of drywall material, and the space defined by the surface of that component facing the corrugated sheet 110, which is the room-exterior-facing surface 106 in FIG. 1, and the surfaces of the corrugated sheet 110 extending from the first series of peaks 114 to the first series of troughs 116 may form air gaps to provide the pockets 112. The corrugated sheet 110 may further include a second series of peaks 120 and a corresponding second series of troughs 122 located proximate to the radiant barrier 108. The second series of peaks 120 may form lines 124 of contact between the corrugated sheet 110 and the next-closest component of the wall panel 100, which in the embodiment of FIG. 1 is the radiant barrier 108, and the space defined by the surface of that component facing the corrugated sheet 110, which is the surface 126 of the radiant barrier 108 facing the panel 102 of drywall material in FIG. 1, and the surfaces of the corrugated sheet extending from the second series of peaks 120 to the second series of troughs 122 may form air gaps to provide additional pockets 112.

The corrugated sheet 110 may have an at least substantially sinusoidal shape when viewed in at least one cross-section at least substantially perpendicular to the room-interior-facing surface 104 and the room-exterior-facing surface 106 of the panel 102 of drywall material. For example, a slope of the corrugated sheet 110 as the corrugated sheet 110 transitions between the first series of peaks 114 and the first series of troughs 116, and as the corrugated sheet 110 transitions between the second series of peaks 120 and the second series of troughs 122 may vary at least substantially continuously, providing a smooth, rounded, arcing wave shape at least substantially resembling a sine wave. The corrugated sheet 110 may include, for example, a cardboard material. More specifically, the corrugated sheet 110 may be of the type and shape employed between panels of planar cardboard material for cardboard shipping boxes.

The wall panel 100 may include an adhesive material 128 located between the panel 102 of drywall material and the corrugated sheet 110 and between the radiant barrier 108 and the corrugated sheet 110. The adhesive material 128 may secure the corrugated sheet 110 to the panel 102 of drywall material and may secure the radiant barrier 108 to the corrugated sheet 110. For example, the radiant barrier 108 may be directly adhered to the corrugated sheet 110 and the corrugated sheet 110 may be directly adhered to the panel 102 of drywall material by the adhesive material 128 in embodiments, such as that shown in FIG. 1, where the corrugated sheet 110 is directly adjacent to, and in contact with, each of the panel 102 of drywall material and the radiant barrier 108. More specifically, the adhesive material 128 may be located only on the first series of peaks 114 of the corrugated sheet 110 facing the room-exterior-facing surface 106 and on the second series of peaks 120 of the corrugated sheet 110 facing the radiant barrier 108. The adhesive material 128 may include, for example, a sticky wax material.

A distance D between the room-exterior-facing surface 106 of the panel 102 of drywall material and the surface 126 of the radiant barrier 108 facing the room-exterior-facing surface 106 of the panel 102 of drywall material, as formed by the corrugated sheet 110, may be, for example, between about $\frac{1}{32}$ inch and about $\frac{1}{4}$ inch. More specifically, the distance D between the room-exterior-facing surface 106 of the panel 102 of drywall material and the surface 126 of the radiant barrier 108 facing the room-exterior-facing surface 106 of the panel 102 of drywall material may be, for example, between about $\frac{1}{16}$ inch and about $\frac{1}{8}$ inch (e.g., about $\frac{1}{16}$ inch).

By spacing the panel 102 of drywall material and the radiant barrier 108 from one another by a distance D utilizing the corrugated sheet 110 to form the pockets 112 of air between the panel 102 of drywall material and the corrugated sheet 110 and between the corrugated sheet 110 and the radiant barrier 108, the wall panel 100 may better insulate against the various potential sources of heat transfer than simply directly adhering the radiant barrier 108 to the room-exterior-facing surface 106 of the wall panel 100. For example, the pockets 112 of air, and the barriers formed by the corrugated sheet 110, may better insulate against heat transfer by conduction and convection, while the radiant barrier 108 may better insulate against heat transfer by radiation.

Figure 2:
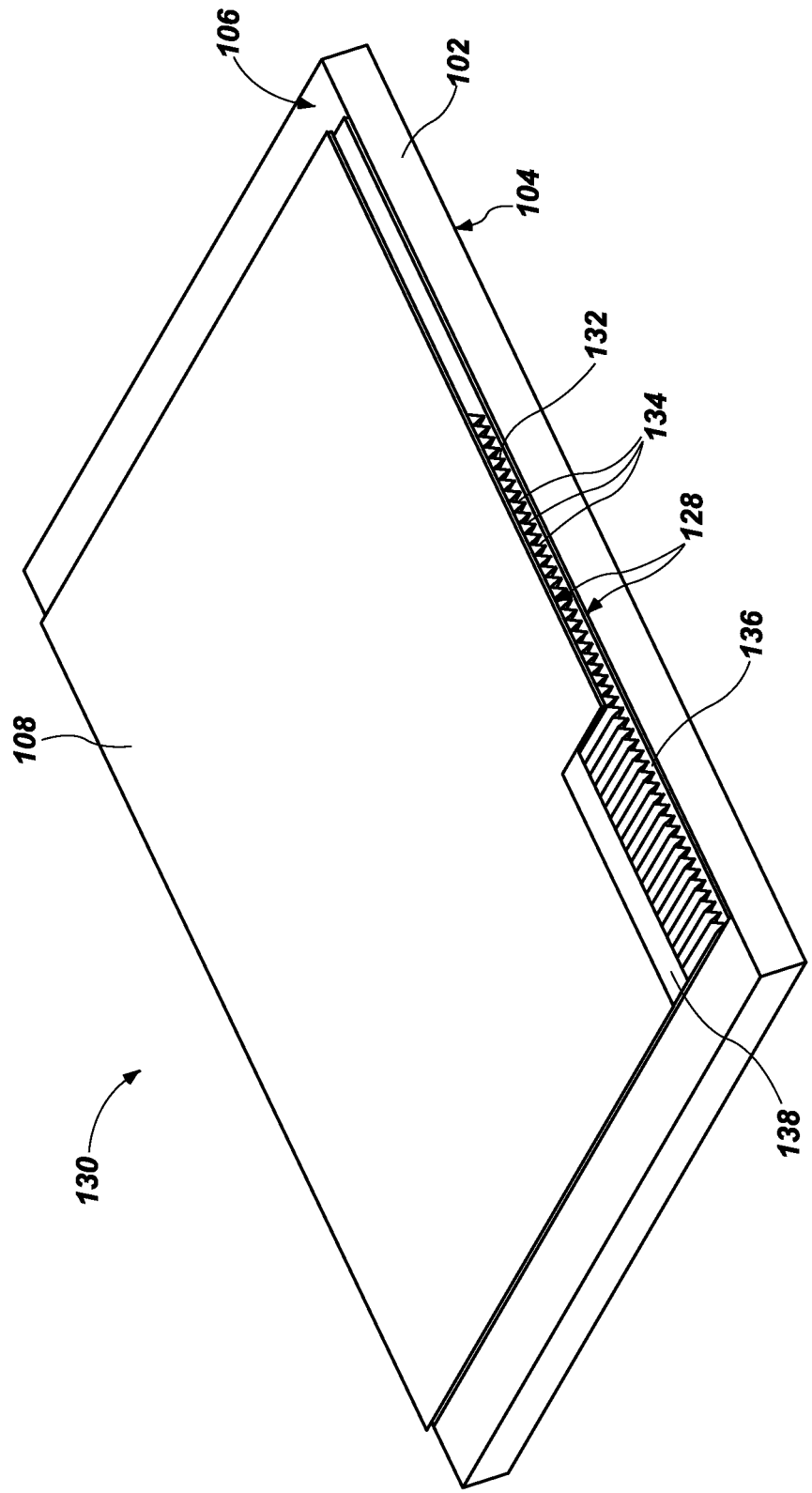
FIG. 2 is a partial-cutaway perspective view of another embodiment of a wall panel for building construction.

FIG. 2 is a partial-cutaway perspective view of another embodiment of a wall panel 130 for building construction. The corrugated sheet 132 shown in FIG. 2 may have an at least substantially triangle wave shape when viewed in at least one cross-section at least substantially perpendicular to the room-interior-facing surface 104 and the room-exterior-facing surface 106 of the panel 102 of drywall material. For example, the corrugated sheet 132 may include at least substantially planar sections 134 extending between the first series of peaks 114 and the first series of troughs 116, and between the second series of peaks 120 and the second series of troughs 122, which may for at least substantially linear intersections between the at least substantially planar sections 134, forming a sawtooth-like, ridged series of spikes resembling a triangle wave.

In some embodiments, such as that shown in FIG. 2, the wall panel 130 may include additional components interposed between the panel 102 of drywall material and the corrugated sheet 132, between the corrugated sheet 132 and the radiant barrier 108, or between the panel 102 of drywall material and the corrugated sheet 132 and between the corrugated sheet 132 and the radiant barrier 108. For example, the wall panel 130 may include a planar sheet 136 interposed between the corrugated sheet 132 and the panel 102 of drywall material. The planar sheet 136 may be directly adhered to the corrugated sheet 132 and to the panel 102 of drywall material by the adhesive material 128. As another example, the wall panel 130 may include an overlying planar sheet 138 interposed between the corrugated sheet 132 and the radiant barrier 108. The overlying planar sheet 138 may be directly adhered to the corrugated sheet 132 and to the radiant barrier 108 by the adhesive material 128. As still another example, the wall panel 130 may include the planar sheet 136 interposed between the corrugated sheet 132 and the panel 102 of drywall material and the other overlying planar sheet 138 interposed between the corrugated sheet 132 and the radiant barrier 108. More specifically, the corrugated sheet 132 may be provided in the form of a complete panel of cardboard, including the planar sheet 136 and the other overlying planar sheet 138 on opposite sides of the corrugated sheet 132, which planar sheet 136 and other overlying planar sheet 138 may, in turn, be adhered to the panel 102 of drywall material and the radiant barrier 108 to form the wall panel 130.

Figure 3:
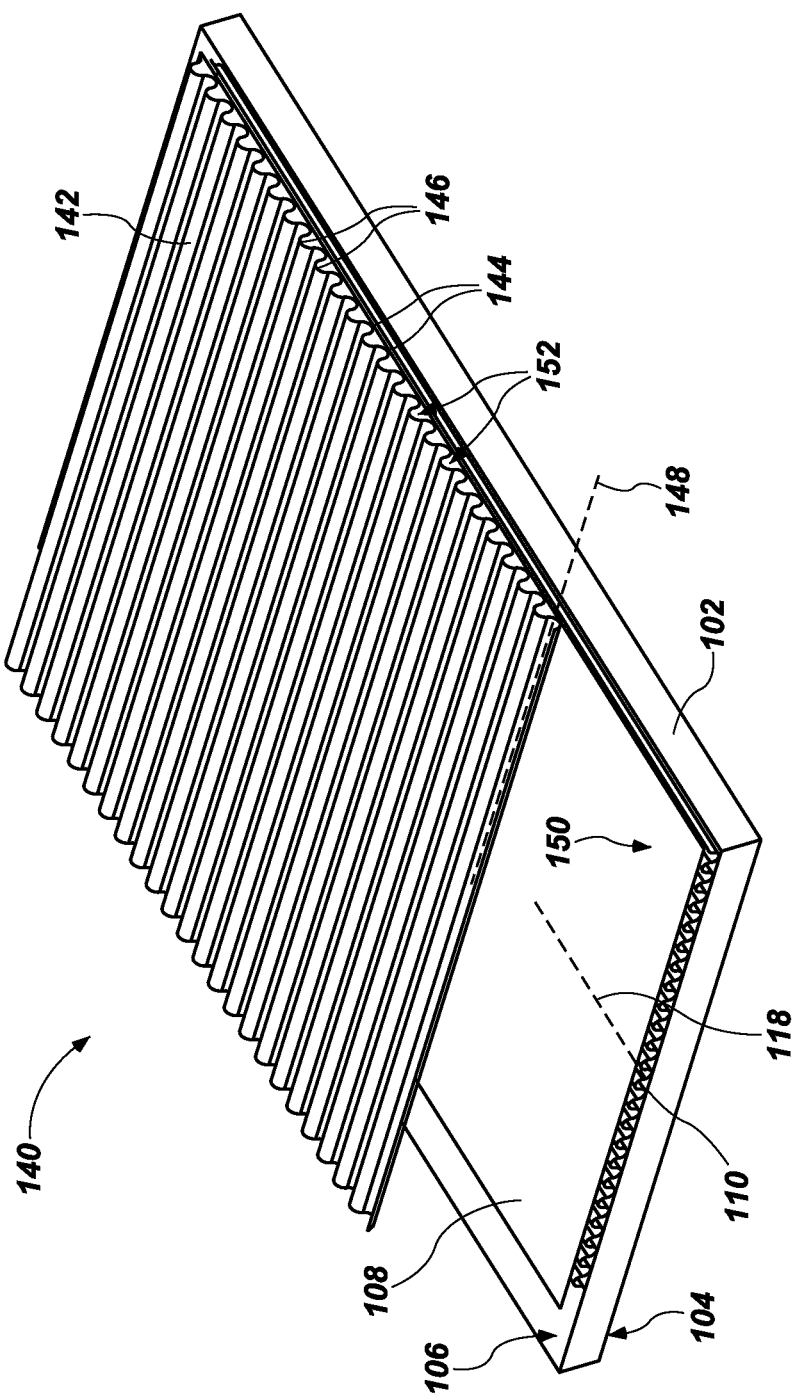
FIG. 3 is a partial-cutaway perspective view of still another embodiment of a wall panel for building construction.

FIG. 3 is a partial-cutaway perspective view of still another embodiment of a wall panel 140 for building construction. The wall panel 140 may include, for example, at least one other corrugated sheet 142 located on a side of the radiant barrier 108 opposite the panel 102 of drywall material. For example, the other corrugated sheet 142 may be secured to the radiant barrier 108 by the adhesive material 128. The corrugated sheet 110 may include, for example, another first series of peaks 144 and another corresponding first series of troughs 146 located proximate to the radiant barrier 108. The other first series of peaks 144 may form lines 148 of contact between the other corrugated sheet 142 and the next-closest component of the wall panel 140, which in the embodiment of FIG. 3 is the radiant barrier 108, and the space defined by the surface of that component facing the other corrugated sheet 142, which is the rearmost surface 150 of the radiant barrier 108 in FIG. 3, and the surfaces of the other corrugated sheet 142 extending from the other first series of peaks 144 to the other first series of troughs 146 may form air gaps to provide still other pockets 152 of air. The other corrugated sheet 142 may form a rearmost surface (i.e., a most exterior portion relative to the interior of a room) of the wall panel 140 on a side of the panel 102 of drywall material facing the room-exterior-facing surface 106.

The lines 148 of contact between the other first series of peaks 144 of the other corrugated sheet 142 and the radiant barrier 108 may extend, for example, in a direction at least substantially perpendicular to the lines 118 of contact between the corrugated sheet 110 and the panel 102 of drywall material. In other embodiments, the lines 148 of contact between the other first series of peaks 144 of the other corrugated sheet 142 and the radiant barrier 108 may extend, for example, in a direction parallel, or oblique, to the lines 118 of contact between the corrugated sheet 110 and the panel 102 of drywall material.

Although the corrugated sheet 110 and the other corrugated sheet 142 are depicted in FIG. 3 as having an at least substantially sinusoidal cross-sectional shape, like the corrugated sheet 110 of FIG. 1, the corrugated sheet 110, the other corrugated sheet 142, or the corrugated sheet 110 and the other corrugated sheet 142 may have an at least substantially triangle wave cross-sectional shape, like the corrugated sheet 132 of FIG. 2. And although the corrugated sheet 110 and the other corrugated sheet 142 are depicted in FIG. 3 as being in direct contact with the panel 102 of drywall material and the radiant barrier 108, like the corrugated sheet 110 of FIG. 1, the corrugated sheet 110, the other corrugated sheet 142, or the corrugated sheet 110 and the other corrugated sheet 142 may be in direct contact with one or more planar sheets 136, 138 (see FIG. 2) interposed between the corrugated sheet 110 and one or both of the panel 102 of drywall material and the radiant barrier and/or located on one or both sides of the other corrugated sheet 142.

Figure 4:
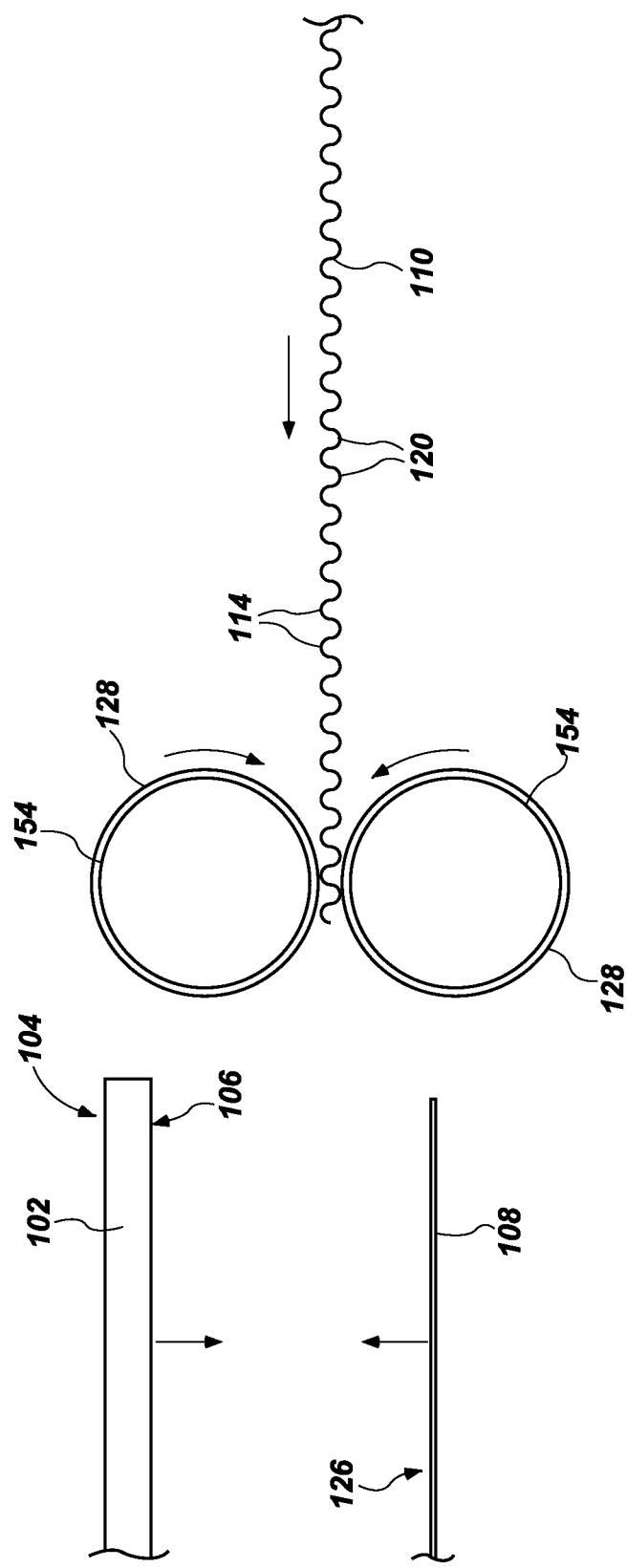
FIG. 4 is a schematic side view of a stage in a method of making the wall panel of FIG. 1.

FIG. 4 is a schematic side view of a stage in a method of making the wall panel 100 of FIG. 1. Before securing the corrugated sheet 110 to the panel 102 of drywall material and the radiant barrier 108, the adhesive material 128 may be placed on the corrugated sheet 110. For example, the corrugated sheet 110 may be moved past an adhesive-applying device, which may place the adhesive material 128 on the corrugated sheet 110, and the adhesive material 128 may be used to secure the corrugated sheet 110 to the panel 102 of drywall material and the radiant barrier 108. More specifically, the corrugated sheet 110 may be moved past rollers 154 having the adhesive material 128 coated on the outside surfaces of the rollers 154. As the first series of peaks 114 and the second series of peaks 120 of the corrugated sheet 110 come into contact with the rollers 154, the rollers 154 may rotate and deposit the adhesive material 128 onto the first series of peaks 114 and the second series of peaks 120. Once the adhesive material 128 has been applied, the adhesive material 128 located on the first series of peaks 114 may be brought into contact with the panel 102 of drywall material and the adhesive material 128 located on the second series of peaks 120 may be brought into contact with the radiant barrier 108 and cured or permitted to cure to adhere the corrugated sheet 110 to the panel 102 of drywall material and the radiant barrier 108. In embodiments where the corrugated sheet 110 is provided with one or more planar sheets 136, 138 (see FIG. 2), the adhesive material 128 may be placed on the planar sheet or sheets 136, 138 (see FIG. 2), rather than on the corresponding first series of peaks 114 or second series of peaks 120.

Because making the wall panel 100 may only require placement of adhesive material 128 and attachment of the various components to one another, the process may be simple, susceptible to automation, and low-cost. As a result, the resulting wall panels 100 may remain a cost-competitive option for providing insulation when constructing a building.

Figure 5:
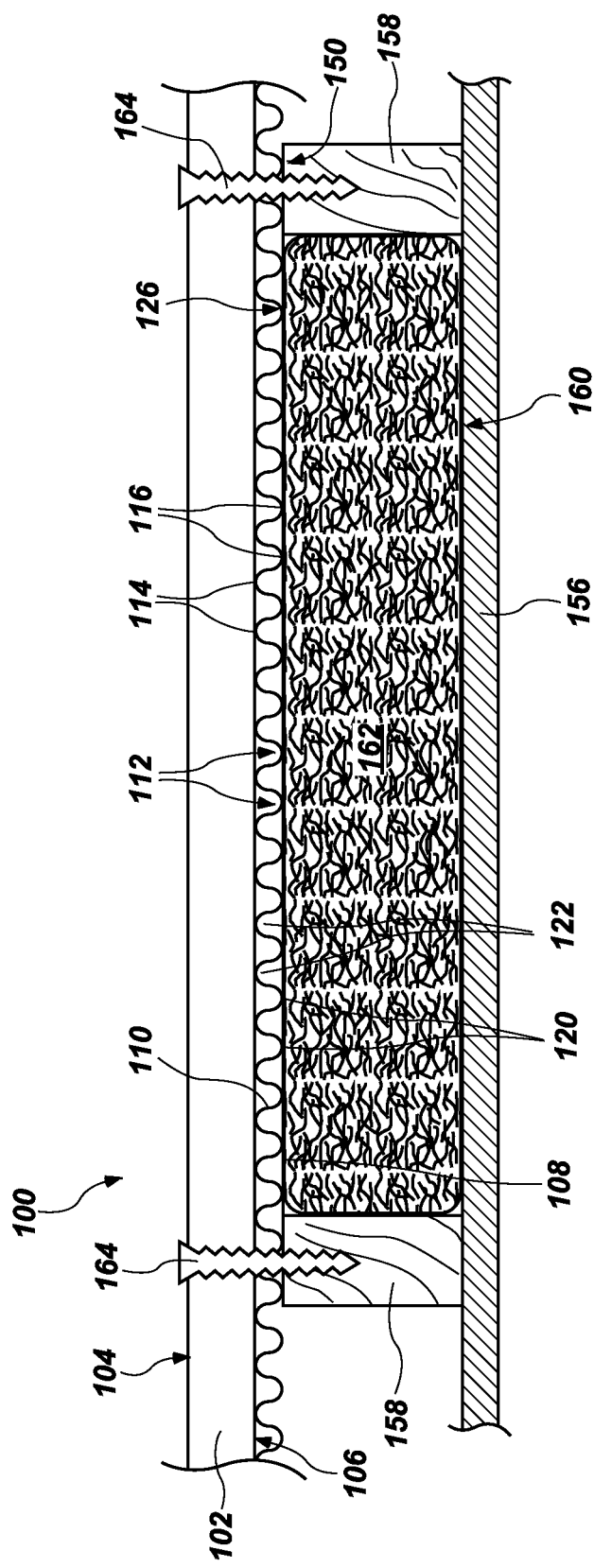
FIG. 5 is a cross-sectional top view of the wall panel of FIG. 1 installed in a building.

FIG. 5 is a cross-sectional top view of the wall panel 100 of FIG. 1 installed in a building. When installing the wall panel 100, a wall frame 156 for supporting the wall panel 100 may be provided. The wall frame 156 may be formed from wooden members, and may link the wall panel 100 to the supporting structure for the building (e.g., may transmit the loads of the wall panel 100 to the foundation, building frame, or other support structure). The wall frame 156 may include studs 158 spaced at regular intervals from one another. The studs 158 may form a wall space 160 into which other insulating material 162 may be placed before installing the wall panel 100. For example, insulating foam or fiberglass insulation may be positioned in the wall space 160 to further inhibit heat transfer due to conduction and convection.

The wall panel 100 may be brought proximate to the studs 158, with the room-exterior-facing surface 106 facing the studs 158. An exterior-most surface of the wall panel 100 may be brought into contact with the studs 158. For example, the rearmost surface 150 of the radiant barrier 108 may be contacted to the studs 158 in embodiments where the radiant barrier 108 is the component of the wall panel 100 farthest to the exterior. In other embodiments, the other corrugated sheet 142 (see FIG. 3) or a planar sheet 136, 138 (see FIG. 2) may be contacted to the studs 158.

The wall panel 100 may be secured to the studs 158 to support the wall panel 100 on the wall frame 156. For example, screws 164 may be inserted through the panel 102 of drywall material, through the corrugated sheet 110, through the radiant barrier 108, and through any other components of the wall panel 100, into the studs 158 to secure the wall panel 100 to the wall frame 156. Tightening the screws 164 may, for example, compress the corrugated sheet 110, although the pockets 112 of air may remain between the panel 102 of drywall material and the corrugated sheet 110 and between the corrugated sheet 110 and the radiant barrier 108 along a majority of the room-exterior-facing surface 106.

Because installing the wall panel 100 may not require any specialized installation techniques, particularly when compared to installing conventional panels of drywall material or such panels with radiant barriers adhered directly to the panels of drywall material, the wall panels 100 may not significantly increase the time and cost for constructing walls. With this and other advantages discussed in this application, as well as other advantages not explicitly mentioned, wall panels 100, 130 (see FIG. 2), 140 (see FIG. 3) in accordance with this disclosure may better inhibit heat transfer, particularly due to conduction and convection, without significantly increasing the cost or complexity associated with making and installing the wall panels 100, 130 (see FIG. 2), 140 (see FIG. 3).

Figure 6:
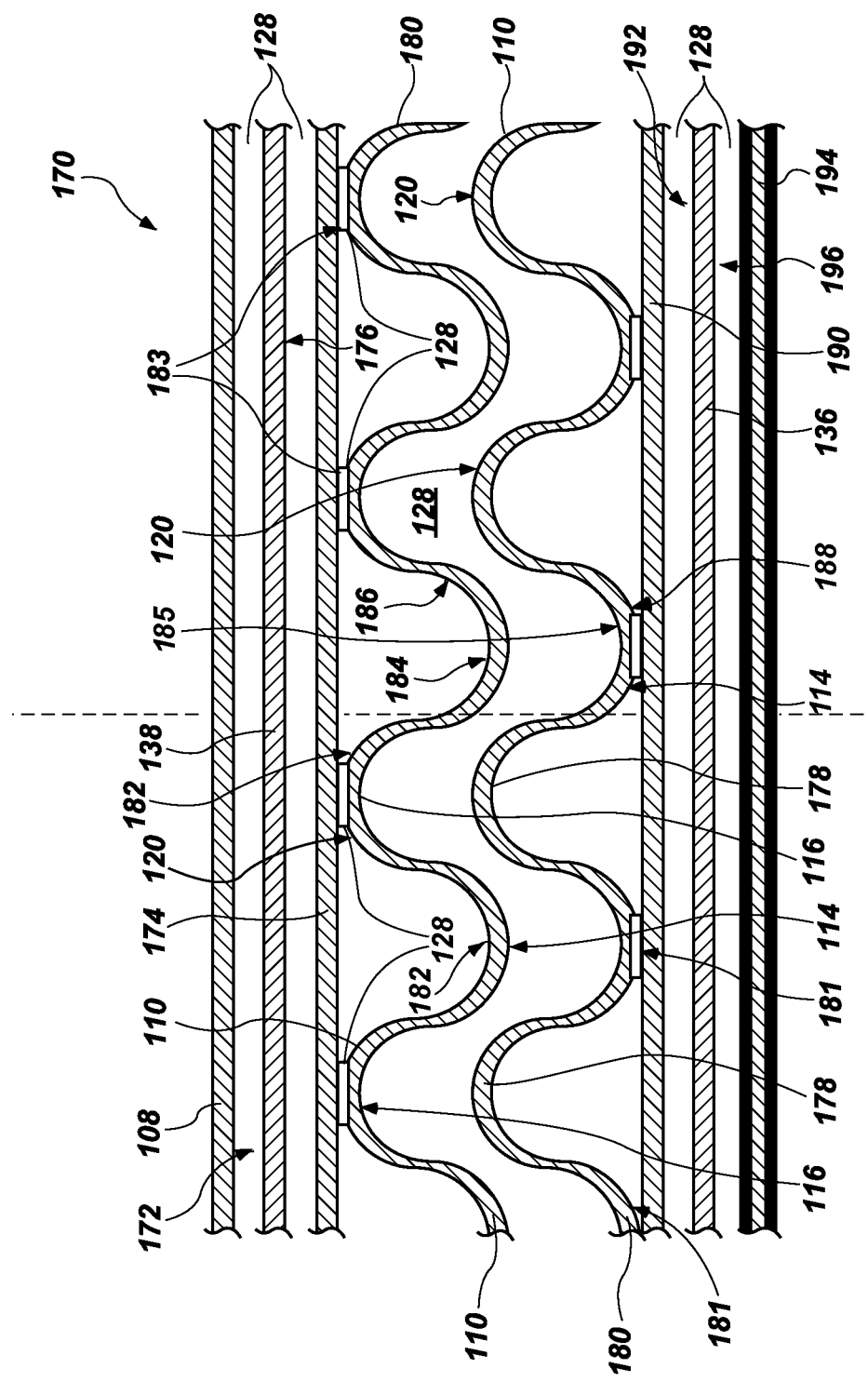
FIG. 6 is a cross-sectional side view of a portion of a laminate product for use with wall panels in accordance with this disclosure.

FIG. 6 is a cross-sectional side view of a portion of a laminate product 170 for use with wall panels in accordance with this disclosure. The laminate product 170 may include the corrugated sheet 110, which may be configured as an undulating lamina of cardboard material. Optionally, the laminate product 170 may include one or more planar sheets 136 and 138 located on opposite sides of the corrugated sheet 110, which planar sheets 136 and 138 may be configured as at least substantially planar lamina of cardboard material. Any planar sheets 136 and 138 included in the laminate product 170 may be secured, directly or indirectly, to the corrugated sheet 110.

The laminate product 170 may include one or more radiant barriers secured to corresponding surfaces of one or more of the corrugated sheet 110, an optional underlying planar sheet 136, and an optional overlying planar sheet 138 of the laminate product 170. For example, the laminate product 170 may include the radiant barrier 108 located on a side of the overlying planar sheet 138 opposite the corrugated sheet 110. More specifically, the radiant barrier 108 may be affixed to an exterior-facing surface 172 of the overlying planar sheet 138 by an adhesive material 128. The radiant barrier 108 may form an exterior-most component of the laminate product 170.

In addition to, or instead of, the radiant barrier 108 located closest to an exterior of a room in which a wall panel including the laminate product 170 may be installed, the laminate product 170 may include a radiant barrier 174 located on a side of the corrugated sheet 110 opposite the optional underlying planar sheet 136. In embodiments where the laminate product 170 includes the optional overlying planar sheet 138, the radiant barrier 174 may be interposed between the corrugated sheet 110 and the overlying planar sheet 138. More specifically, the radiant barrier 174 may be affixed to an interior-facing surface 176 of the overlying planar sheet 138 and to the second series of peaks 120 of the corrugated sheet 110 or a second series of peaks 183 of a corrugated radiant barrier 180 secured to an exterior-facing surface 182 of the corrugated sheet 110 by an adhesive material 128.

In addition to, or instead of, the radiant barrier 108 located at the exterior, the radiant barrier 174 located between the corrugated sheet 110 and the overlying planar sheet 138, or some combination or subcombination thereof, the laminate product 170 may include a corrugated radiant barrier 180 located adjacent to the corrugated sheet 110. The corrugated radiant barrier 180 may be located on an exterior-facing surface 182 of the corrugated sheet 110 or on an interior-facing surface 184 of the corrugated sheet 110. The corrugated radiant barrier 180 may undulate, following the waving patterns of the corrugated sheet 110 and forming its own first series of peaks 178 and corresponding first series of troughs 181 (as shown on the left-hand side of FIG. 6) or its own second series of peaks 183 and corresponding second series of troughs 185 (as shown on the right-hand side of FIG. 6) covering those of the corrugated sheet 110. More specifically, the corrugated radiant barrier 180 may cover, and be affixed to, the first series of peaks 114 and corresponding first series of troughs 116 forming the interior-facing surface 188 of the corrugated sheet 110, or may cover, and be affixed to, the second series of peaks 120 and corresponding second series of troughs 122 forming the exterior-facing surface 182 of the corrugated sheet 110, or both by an adhesive material.

In addition to, or instead of, the radiant barrier 108 located at the exterior, the radiant barrier 174 located between the corrugated sheet 110 and the overlying planar sheet 138, the corrugated radiant barrier 180 located on one or both major surfaces 186 and 188 of the corrugated sheet 110, or some combination or subcombination thereof, the laminate product 170 may include a first radiant barrier 190 located on a side of the corrugated sheet 110 opposite the optional overlying planar sheet 138. In embodiments where the laminate product 170 includes the optional underlying planar sheet 136, the first radiant barrier 190 may be interposed between the corrugated sheet 110 and the underlying planar sheet 136. More specifically, the first radiant barrier 190 may be affixed to an exterior-facing surface 192 of the underlying planar sheet 136 and to the first series of troughs 116 of the corrugated sheet 110 or the first series of troughs 181 of a corrugated radiant barrier 180 secured to an interior-facing surface 188 of the corrugated sheet 110 by an adhesive material 128.

In addition to, or instead of, the radiant barrier 108 located at the exterior, the radiant barrier 174 located between the corrugated sheet 110 and the overlying planar sheet 138, the corrugated radiant barrier 180 located on one or both major surfaces 186 and 188 of the corrugated sheet 110, the first radiant barrier 190 located between the corrugated sheet 110 and the underlying planar sheet 136, or some combination or subcombination thereof, the laminate product 170 may include an interior-most radiant barrier 194 located on a side of the underlying planar sheet 136 opposite the corrugated sheet 110. More specifically, the interior-most radiant barrier 194 may be affixed to an interior-facing surface 196 of the underlying planar sheet 136 by an adhesive material 128.

The interior-most radiant barrier 194 may form an interior-most component of the laminate product 170.

Laminate products in accordance with this disclosure, and wall panels resulting from affixing the laminate products to a panel of drywall material, may include any one, any combination, or any subcombination of the radiant barriers, their positioning and manner of affixation, described previously in connection with FIG. 6. Certain, specific configurations for wall panels, and their associated laminate products including radiant barriers, are discussed in greater detail in connection with FIGS. 7 through 9.

Figure 7:
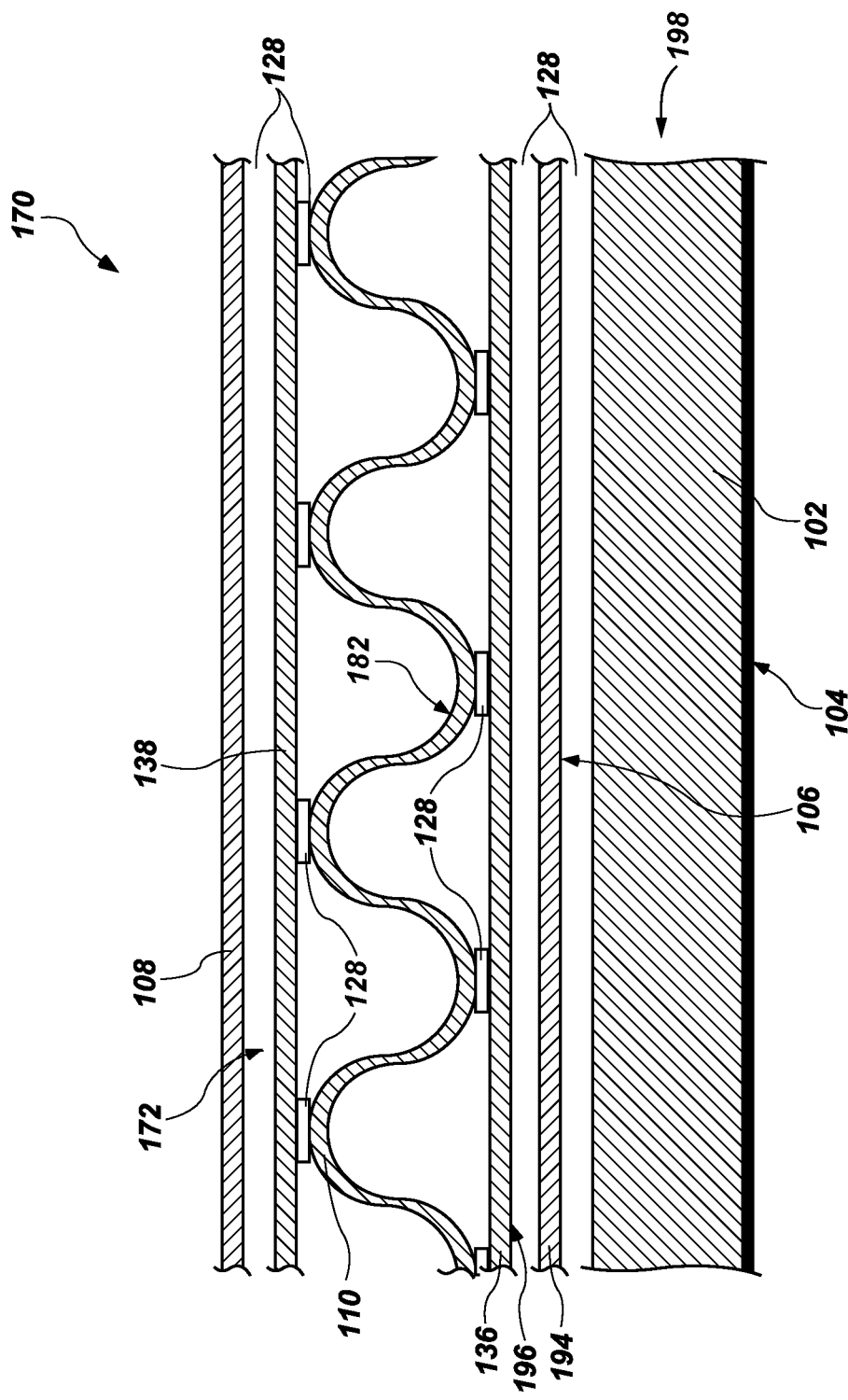
FIG. 7 is a cross-sectional side view of a portion of another embodiment of a wall panel for building construction.

FIG. 7 is a cross-sectional side view of a portion of another embodiment of a wall panel 198 for building construction. The wall panel 198 may include a panel 102 of drywall material and a laminate product 170 affixed to a room-exterior-facing surface 106 of the panel 102 of drywall material. The laminate product 170 may include an interior-most radiant barrier 194 located adjacent to, be in contact with, and optionally be adhered to the panel 102 of drywall material. The interior-most radiant barrier 194 may form an interior-most component of the laminate product 170. The laminate product 170 may include a planar sheet 136 located on a side of the interior-most radiant barrier 194 opposite the panel 102 of drywall material, such that the interior-most radiant barrier 194 may be interposed between the planar sheet 136 and the panel 102 of drywall material. The interior-most radiant barrier 194 may be, for example, affixed to each of the planar sheet 136 and the panel 102 of drywall material by an adhesive material 128.

A corrugated sheet 110 may be affixed to the planar sheet 136 on a side of the planar sheet 136 opposite the interior-most radiant barrier 194, and another overlying planar sheet 138 may be affixed to the corrugated sheet 110 on a side of the corrugated sheet 110 opposite the first planar sheet 136. In other words, the corrugated sheet 110 may be interposed between the planar sheets 136 and 138, each of which sheets 110, 136, and 138 may include a cardboard material. Another radiant barrier 108 may be affixed to the overlying planar sheet 138 located distal from the panel 102 of drywall material on a side of the overlying planar sheet 138 opposite the panel 102 of drywall material, such that the radiant barrier 108 may form an exterior-most component of the laminate product 170 and of the wall panel 198.

Figure 8:
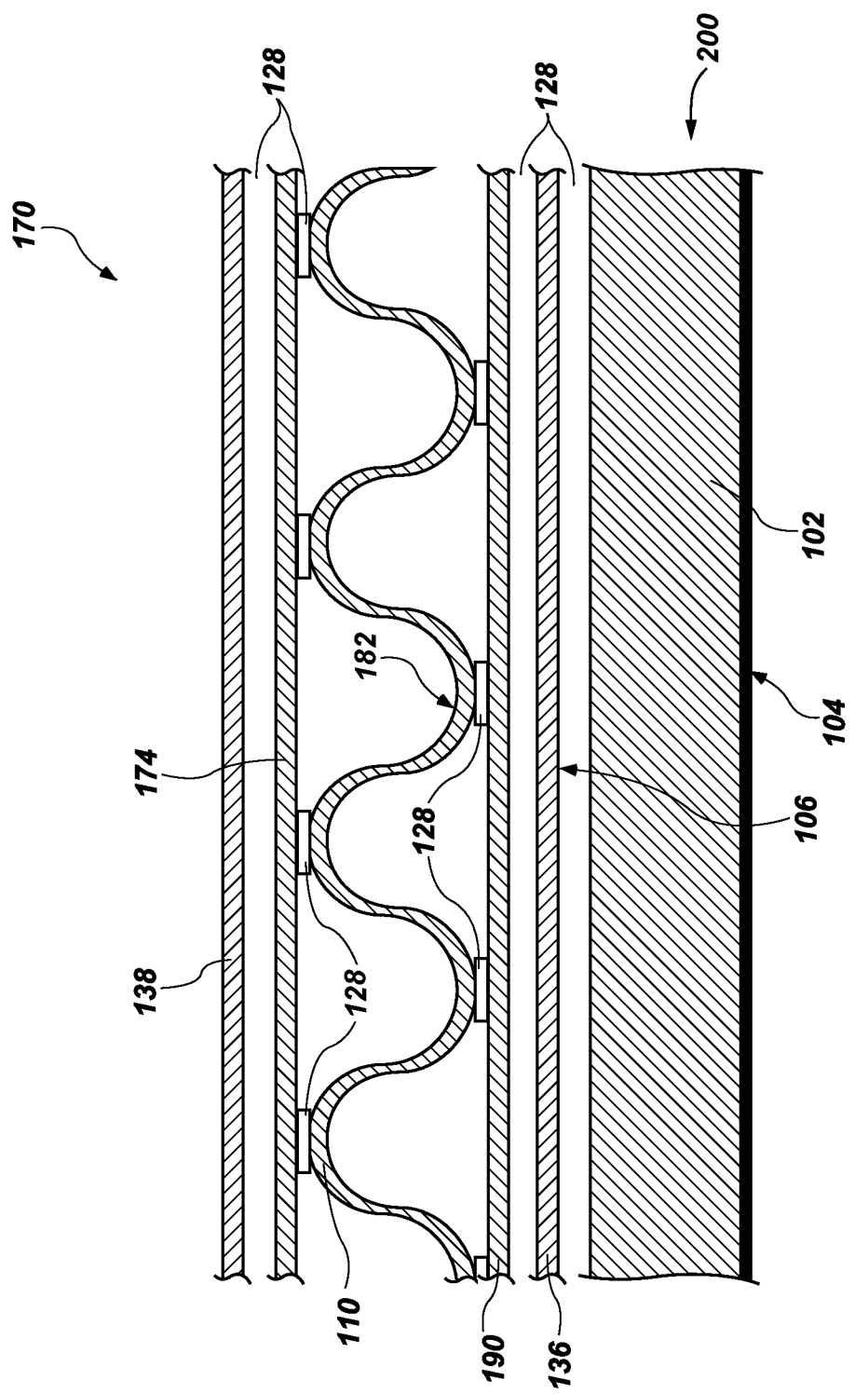
FIG. 8 is a cross-sectional side view of a portion of still another embodiment of a wall panel for building construction.

FIG. 8 is a cross-sectional side view of a portion of still another embodiment of a wall panel 200 for building construction. The wall panel 200 may include a panel 102 of drywall material and a laminate product 170 affixed to a room-exterior-facing surface 106 of the panel 102 of drywall material. The laminate product 170 may include a planar sheet 136 adjacent to, in contact with, and optionally adhered to the panel 102 of drywall material. The planar sheet 136 may form an interior-most component of the laminate product 170. The laminate product 170 may include a first radiant barrier 190 located on a side of the planar sheet 136 opposite the panel 102 of drywall material, such that the planar sheet 136 may be interposed between the first radiant barrier 190 and the panel 102 of drywall material. The planar sheet 136 may be, for example, affixed to each of the first radiant barrier 190 and the panel 102 of drywall material by an adhesive material 128.

A corrugated sheet 110 may be affixed to the first radiant barrier 190 on a side of the first radiant barrier 190 opposite the planar sheet 136. Another radiant barrier 174 may be affixed to the corrugated sheet 110 on a side of the corrugated sheet 110 opposite the first radiant barrier 190. In other words, the corrugated sheet 110 may be interposed between the radiant barriers 174 and 190. Another overlying planar sheet 138 may be affixed to the radiant barrier 174 located distal from the panel 102 of drywall material on a side of the radiant barrier 174 opposite the panel 102 of drywall material, such that the overlying planar sheet 138 may form an exterior-most component of the laminate product 170 and of the wall panel 198.

Though FIGS. 7 and 8 have depicted the laminate product 170 as including radiant barriers 108 and 194 at the innermost and outermost extents of the laminate product 170 or as including radiant barriers 174 and 190 located immediately adjacent to the corrugated sheet 110, other combinations of the different positions for the radiant barriers 108, 174, 190, and 194 are contemplated. For example, the laminate product 170 may include the exterior-most radiant barrier 108 and the first radiant barrier 190 adjacent to the corrugated sheet 110 on a side of the corrugated sheet 110 proximate to the panel 102 of drywall material. As another example, the laminate product 170 may include the interior-most radiant barrier 194 and the radiant barrier 174 located adjacent to the corrugated sheet 110 on a side of the corrugated sheet 110 opposite the panel 102 of drywall material. As yet another example, the laminate product 170 may include any combination of three of the radiant barriers 108, 174, 190, 194.

Figure 9:
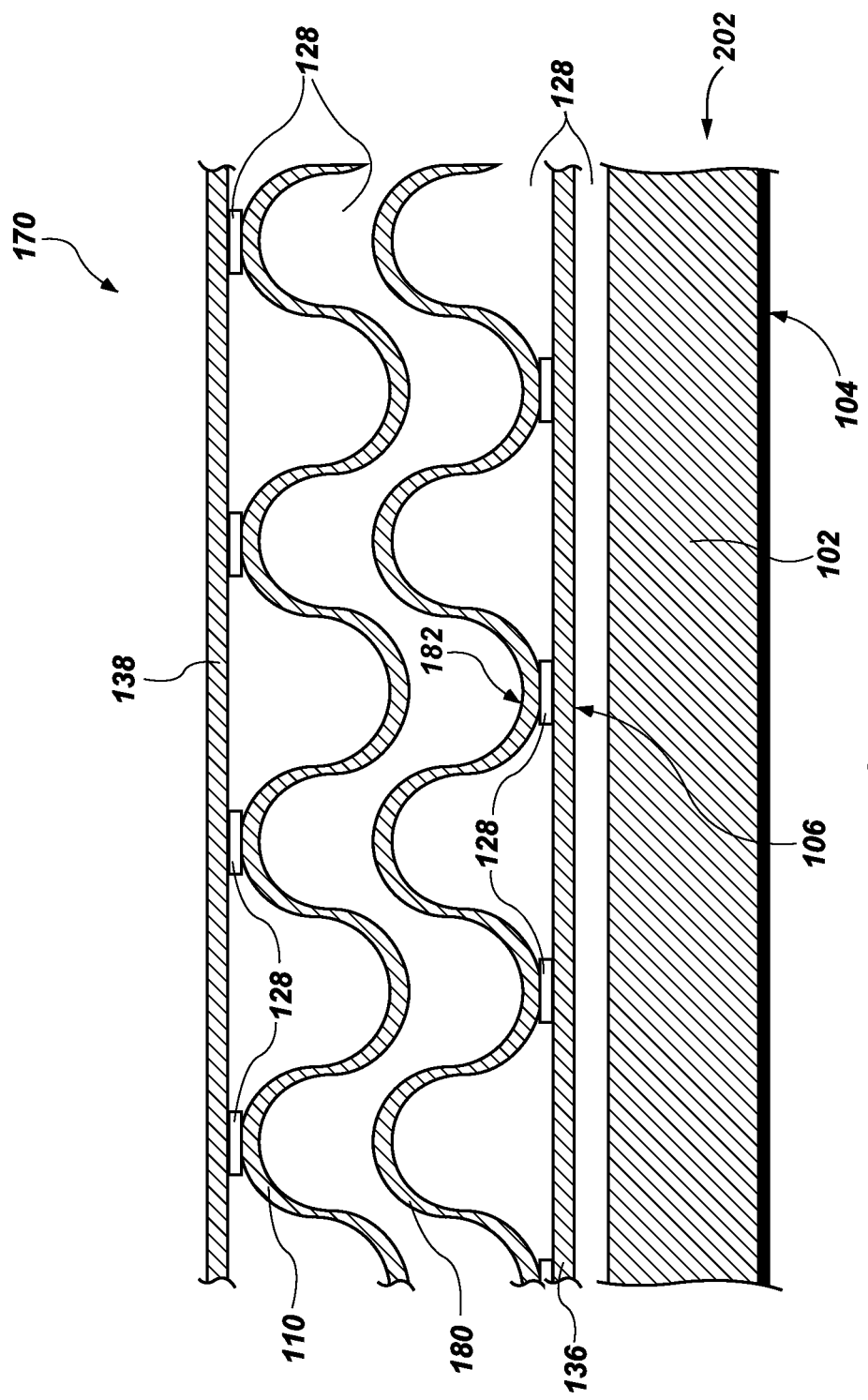
FIG. 9 is a cross-sectional side view of a portion of yet another embodiment of a wall panel for building construction.

FIG. 9 is a cross-sectional side view of a portion of yet another embodiment of a wall panel 202 for building construction. The wall panel 202 may include a panel 102 of drywall material and a laminate product 170 affixed to a room-exterior-facing surface 106 of the panel 102 of drywall material. The laminate product 170 may include a planar sheet 136 adjacent to, in contact with, and optionally adhered to the panel 102 of drywall material. The planar sheet 136 may form an interior-most component of the laminate product 170. The laminate product 170 may include. A corrugated sheet 110 affixed to the planar sheet 136 on a side of the planar sheet 136 opposite the panel 102 of drywall material.

A corrugated radiant barrier 180 may be affixed to the corrugated sheet 110 in such a manner that the corrugated radiant barrier 180 may undulate with the waves of the corrugated sheet 110. The corrugated radiant barrier 180 may be, for example, affixed to the corrugated sheet 110 on a side of the corrugated sheet 110 opposite the panel 102 of drywall material by an adhesive material 128. Another overlying planar sheet 138 may be affixed to the corrugated radiant barrier 180 on a side of the corrugated radiant barrier 180 opposite the first planar sheet 136. The planar sheets 136 and 138 may form the outermost components of the laminate product 170, with the corrugated sheet and the corrugated radiant barrier 180 sandwiched therebetween.

Though the corrugated radiant barrier 180 is depicted as being located on a specific side of the corrugated sheet 110, and is depicted as being used without the inclusion of any other radiant barriers secured to, and undulating with, the corrugated sheet 110 or extending in an at least substantially planar manner over one or more surfaces of the planar sheets 136 and 138, the corrugated radiant barrier 180 may be located on the opposite side of the corrugated sheet 110 proximate to the panel 102 of drywall material, another corrugated radiant barrier 180 located on the opposite side of the corrugated sheet 110 proximate to the panel 102 of drywall material may be included, and one or more other radiant barriers 108, 174, 190, 194 (see FIG. 6) may also be provided.

Additional, nonlimiting embodiments within the scope of this disclosure include, but are not limited to, the following:

Embodiment 1

A wall panel for building construction, comprising: a panel of drywall material comprising a room-interior-facing surface and a room-exterior-facing surface; a radiant barrier comprising a material reflective to heat located proximate to the room-exterior-facing surface; and a corrugated sheet interposed between the panel of drywall material and the radiant barrier, the corrugated sheet forming pockets of air between the panel of drywall material and the corrugated sheet and between the radiant barrier and the corrugated sheet.

Embodiment 2

The wall panel of Embodiment 1, wherein the radiant barrier is directly adhered to the corrugated sheet and the corrugated sheet is directly adhered to the panel of drywall material by an adhesive material.

Embodiment 3

The wall panel of Embodiment 2, wherein the adhesive material is located only on peaks of the corrugated sheet facing the room-exterior-facing surface and on peaks of the corrugated sheet facing the radiant barrier.

Embodiment 4

The wall panel of Embodiment 2 or Embodiment 3, wherein the adhesive material comprises a wax material.

Embodiment 5

The wall panel of any one of Embodiment 1, further comprising a planar sheet interposed between the corrugated sheet and the panel of drywall material, the planar sheet directly adhered to the corrugated sheet and to the panel of drywall material by an adhesive material.

Embodiment 6

The wall panel of Embodiment 5, further comprising at least one other radiant barrier comprising a material reflective to heat adhered to the planar sheet, the at least one other radiant barrier interposed between the panel of drywall material and the corrugated sheet on at least one corresponding side of the planar sheet.

Embodiment 7

The wall panel of Embodiment 1, further comprising a planar sheet interposed between the corrugated sheet and the radiant barrier, the planar sheet directly adhered to the corrugated sheet and to the radiant barrier by an adhesive material.

Embodiment 8

The wall panel of any one of Embodiments 1 through 7, wherein the corrugated sheet comprises a cardboard material.

Embodiment 9

The wall panel of any one of Embodiments 1 through 8, further comprising another corrugated sheet located on a side of the radiant barrier opposite the panel of drywall material, the other corrugated sheet secured to the radiant barrier by an adhesive material.

Embodiment 10

The wall panel of Embodiment 9, wherein lines of contact between peaks of the corrugated sheet and the panel of drywall material extend at least substantially perpendicular to lines of contact between the other corrugated sheet and the radiant barrier.

Embodiment 11

The wall panel of any one of Embodiments 1 through 10, wherein the corrugated sheet has an at least substantially sinusoidal shape when viewed in at least one cross-section at least substantially perpendicular to the room-interior-facing surface and the room-exterior-facing surface of the panel of drywall material.

Embodiment 12

The wall panel of any one of Embodiments 1 through 10, wherein the corrugated sheet has an at least substantially triangle wave shape when viewed in at least one cross-section at least substantially perpendicular to the room-interior-facing surface and the room-exterior-facing surface of the panel of drywall material.

Embodiment 13

The wall panel of any one of Embodiments 1 through 8, 11, and 12, wherein the radiant barrier forms a rearmost surface of the wall panel on a side of the panel of drywall material facing the room-exterior-facing surface.

Embodiment 14

The wall panel of any one of Embodiments 1, 2, 4, 8, and 11 through 13, wherein the radiant barrier is affixed to, and undulates with, the corrugated sheet.

Embodiment 15

A method of making a wall panel for building construction, comprising: placing an adhesive material on a first series of peaks of a corrugated sheet on a first side of the corrugated sheet; adhering the corrugated sheet to a panel of drywall material by contacting the first series of peaks and the adhesive material to the drywall material; placing the adhesive material on a second series of peaks of the corrugated sheet on a second, opposite side of the corrugated sheet; and adhering the corrugated sheet to a radiant barrier comprising a reflective material by contacting the second series of peaks and the adhesive material to the radiant barrier.

Embodiment 16

The method of Embodiment 15, wherein placing the adhesive material on the first series of peaks of the corrugated sheet comprises contacting the first series of peaks to a first roller having the adhesive material on an exterior surface of the first roller, the first roller located on the first side of the corrugated sheet, and rotating the first roller as the corrugated sheet is moved past the first roller and wherein placing the adhesive material on the second series of peaks of the corrugated sheet comprises contacting the second series of peaks to a second roller having the adhesive material on an exterior surface of the second roller, the second roller located on the second, opposite side of the corrugated sheet, and rotating the second roller as the corrugated sheet is moved past the second roller.

Embodiment 17

A method of installing a wall panel for building construction, comprising: placing a radiant barrier of a wall panel proximate at least one stud of a wall frame, the radiant barrier comprising a reflective material, the radiant barrier located on a first side of a corrugated sheet, the wall panel comprising a panel of drywall material adhered to a second, opposite side of the corrugated sheet; and securing the wall panel to the wall frame by at least one screw extending through the panel of drywall material, through the corrugated sheet, and through the radiant barrier into the at least one stud.

Embodiment 18

The method of Embodiment 17, further comprising compressing the corrugated sheet in response to securing the wall panel to the wall frame.

Embodiment 19

The method of Embodiment 17 or Embodiment 18, wherein placing the radiant barrier proximate the at least one stud comprises contacting the radiant barrier directly to the at least one stud.

Embodiment 20

The method of Embodiment 17 or Embodiment 18, wherein the wall panel further comprises another corrugated sheet located on a side of the radiant barrier opposite the panel of drywall material and wherein placing the radiant barrier proximate the at least one stud comprises contacting the other corrugated sheet directly to the at least one stud.

While certain illustrative embodiments have been described in connection with the figures, those of ordinary skill in the art will recognize and appreciate that the scope of this disclosure is not limited to those embodiments explicitly shown and described in this disclosure. Rather, many additions, deletions, and modifications to the embodiments described in this disclosure may be made to produce embodiments within the scope of this disclosure, such as those specifically claimed, including legal equivalents. In addition, features from one disclosed embodiment may be combined with features of another disclosed embodiment while still being within the scope of this disclosure, as contemplated by the inventor.

What is claimed is:

1. A wall panel for building construction, comprising:
    a corrugated sheet comprising a first series of peaks on a first side of the corrugated sheet configured for positioning to face a room interior and a second series of peaks on a second, opposite side of the corrugated sheet configured for positioning to face a room exterior; and
    a radiant barrier comprising a material reflective to heat secured only to the second series of peaks, the corrugated sheet forming pockets of air between the radiant barrier and the corrugated sheet;
    wherein a majority of the radiant barrier is exposed to air on a side configured for positioning to face a room interior and the majority of the radiant barrier is exposed to air on an opposite side configured for positioning to face a room exterior.

2. The wall panel of claim 1, further comprising another corrugated sheet secured to the radiant barrier on a side of the radiant barrier opposite the corrugated sheet, such that the radiant barrier is interposed between the corrugated sheet and the other corrugated sheet.

3. The wall panel of claim 2, wherein lines of contact between the second series of peaks of the corrugated sheet and the radiant barrier extend at least substantially perpendicular to lines of contact between another series of peaks of the other corrugated sheet and the radiant barrier.

4. The wall panel of claim 1, wherein the corrugated sheet has an at least substantially sinusoidal shape when viewed in at least one cross-section.

5. The wall panel of claim 1, wherein the corrugated sheet has an at least substantially triangle wave shape when viewed in at least one cross-section.

6. The wall panel of claim 1, wherein the radiant barrier forms a rearmost surface of the wall panel on a side of the corrugated sheet for positioning to face a room exterior.

7. The wall panel of claim 1, wherein an adhesive material adhering the radiant barrier to the second series of peaks is located only on the second series of peaks.

8. The wall panel of claim 7, wherein the adhesive material comprises a wax material.

9. The wall panel of claim 1, wherein the corrugated sheet comprises a cardboard material.

10. The wall panel for building construction of claim 1, further comprising a panel of drywall material adhered to the first series of peaks.

* * * * *